United States Patent
Dozier et al.

(10) Patent No.: US 9,690,816 B2
(45) Date of Patent: *Jun. 27, 2017

(54) SYSTEMS, METHODS AND SOFTWARE FOR ENTITY RELATIONSHIP RESOLUTION

(71) Applicant: THOMSON REUTERS GLOBAL RESOURCES, Baar (CH)

(72) Inventors: Christopher Dozier, Minneapolis, MN (US); Souptik Datta, Cedar Grove, NJ (US); Merine Thomas, Eagan, MN (US); Hugo Molina-Salgado, Eagan, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/624,586

(22) Filed: Feb. 18, 2015

(65) Prior Publication Data
US 2015/0161191 A1 Jun. 11, 2015

Related U.S. Application Data

(63) Continuation of application No. 13/435,889, filed on Mar. 30, 2012, now Pat. No. 8,990,152, which is a (Continued)

(51) Int. Cl.
G06F 17/30 (2006.01)
G06F 7/00 (2006.01)

(52) U.S. Cl.
CPC .. *G06F 17/30345* (2013.01); *G06F 17/30303* (2013.01); *G06F 17/30545* (2013.01)

(58) Field of Classification Search
USPC ........................................ 707/803, 755, 609
See application file for complete search history.

(56) References Cited

U.S. PATENT DOCUMENTS 5,974,420 A * 10/1999 Lehman et al.
6,658,412 B1 12/2003 Jenkins et al.
(Continued)

FOREIGN PATENT DOCUMENTS

CA 2 710 427 A1 7/2009
EP 2 245 554 A1 11/2010
(Continued)

OTHER PUBLICATIONS

International search report and written opinion issued in corresponding PCT Application No. PCT/US2008/088038, dated Jun. 9, 2009.
(Continued)

*Primary Examiner* — Kuen Lu

(57) ABSTRACT

A method includes receiving an entity record, wherein the entity record comprising at least one entity field element, and resolving the entity record to an authority record being associated with an initial authority file, wherein the authority record comprising at least one authority field element. The method further includes calculating a field element update measurement, the field element update measurement being associated with the at least one entity field element and the at least one authority field element and if the field element update measurement meets or exceeds a threshold, updating the authority record, or if not, not updating the authority record. The method further includes developing, in response to updating the authority record, an updated authority file associated with at least one updated authority record. The method also includes incorporating an additional authority record to the updated authority file.

15 Claims, 3 Drawing Sheets

Related U.S. Application Data continuation-in-part of application No. 12/341,913, filed on Dec. 22, 2008, now Pat. No. 9,600,509.

(60) Provisional application No. 61/008,891, filed on Dec. 21, 2007.

(56) References Cited

U.S. PATENT DOCUMENTS

| | | | |
|---|---|---|---|
| 7,403,942 | B1 | 7/2008 | Bayliss |
| 7,870,151 | B2 | 1/2011 | Mayer et al. |
| 8,990,152 | B2 | 3/2015 | Dozier et al. |
| 9,600,509 | B2 | 3/2017 | Conrad et al. |
| 2004/0019593 | A1* | 1/2004 | Borthwick et al. ............ 707/4 |
| 2004/0162833 | A1* | 8/2004 | Jones et al. .................. 707/100 |
| 2004/0243588 | A1 | 12/2004 | Tanner et al. |
| 2004/0267824 | A1* | 12/2004 | Pizzo et al. .................. 707/200 |
| 2005/0273346 | A1 | 12/2005 | Frost |
| 2005/0273453 | A1* | 12/2005 | Holloran ........................ 707/1 |
| 2006/0064271 | A1 | 3/2006 | Liang et al. |
| 2007/0014440 | A1* | 1/2007 | Lo ............................. 382/124 |
| 2007/0038449 | A1* | 2/2007 | Coifman ..................... 704/243 |

FOREIGN PATENT DOCUMENTS

| | | |
|---|---|---|
| EP | 2 631 822 A1 | 8/2013 |
| WO | 2009/086311 A1 | 7/2009 |

OTHER PUBLICATIONS

International Application Serial No. PCT/US2008/088038, Invitation to Pay additional fees mailed on Mar. 31, 2009, 9 pages.

Elfeky et al., "Tailor: A Record Linkage Toolbox", Proceedings 18th International Conference on Data Engineering. vol. 18, (Feb. 26, 2002), pp. 17-28.

Fair et al., "Record Linkage in the National Dose Registry of Canada", European Journal of Cancer, Pergamon Press, vol. 33, (Apr. 1, 1997), pp. S37-S43.

Jordi et al., "On the Use of Semantic Blocking Techniques for Data Cleansing and Integration", Database Engineering and Applications Symposium, (Sep. 1, 2007), pp. 190-198.

International Preliminary Report on Patentability and written opinion issued in corresponding PCT Application No. PCT/US2008/088038, dated Jun. 22, 2010, 10 pages.

Extended European Search Report (EESR) issued in corresponding European Patent Application No. 13150404.5 dated Jul. 31, 2013, 11 pages.

"Chapter 6: Partitioning and Basic Parallel Processing ED—Gavin Powell", dated Jan. 1, 2005, Oracle Data Warehouse Tuning for 10G, Elsevier Digital Press, pp. 137-159.

First Office Action dated Jul. 7, 2015, issued in corresponding Canadian Patent Application No. 2710427, 8 pages.

Response to First Office Action dated Jan. 7, 2016, issued in corresponding Canadian Patent Application No. 2710427, 23 pages.

Second Office Action dated Feb. 5, 2016, issued in corresponding Canadian Patent Application No. 2710427, 4 pages.

Response to Second Office Action dated Aug. 5, 2016 issued in corresponding Canadian Patent Application No. 2710427, 9 pages.

Third Office Action dated Sep. 1, 2016, issued in corresponding Canadian Patent Application No. 2710427, 7 pages.

Response to Third Office Action dated Mar. 1, 2017 issued in corresponding Canadian Patent Application No. 2710427, 11 pages.

* cited by examiner

SYSTEMS, METHODS AND SOFTWARE FOR ENTITY RELATIONSHIP RESOLUTION

RELATED APPLICATION

This application is a continuation of U.S. patent application Ser. No. 13/435,889 filed Mar. 30, 2012, which is a continuation-in-part of U.S. patent application Ser. No. 12/341,913 filed Dec. 22, 2008, which claims priority to U.S. Provisional Application 61/008,891 filed on Dec. 21, 2007, the contents of which are all incorporated herein in their entirety.

COPYRIGHT NOTICE AND PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2014 Thomson Reuters.

TECHNICAL FIELD

Various embodiments of the present invention concern systems, methods and software for entity relationship resolution.

BACKGROUND

There are over three hundred million people living in the United States, and for each given individual, there are generally several entity records. Additionally there are millions of organizations established in the United States, each of which is associated with several entity record documents. Examples of entity records may include real estate recordations, SEC filings, birth certificates, death certificates, marriage licenses, hunting and fishing licenses, motor vehicle licenses, litigation documents, news articles, financial documents, medical records, any structured record extracted from electronic text and the like. Creating a profile based on available data for any given entity (i.e. organization and/or individual) would therefore require searching several individual databases (one database for each type of entity record). This process of manually searching and collecting data throughout various databases is time consuming and potentially expensive. The problem is further compounded with the added effort necessary to ensure that records from various databases actually resolve to the correct, given entity.

Entity resolution (ER) is a well-studied problem in natural language processing that involves identifying and linking data to a real world entity. Each real world entity has a corresponding authority record which is usually maintained in a master record database (MRD). An authority record is a comprehensive record for a given entity. For example, an authority record may contain all the known names, addresses and phone numbers for a given entity. Entity records are linked to a given authority record based on some matching evidence. ER typically requires matching several different attributes of the entity using various similarity metrics and coming up with a match decision combining the individual similarity values. The individual attribute matching often is more complex than simple string matching, as a single entity attribute may be expressed in more than one way and mean the same thing. For instance, when trying to determine if the phrases "Barack Obama" and "President Obama" are referring to the same individual, a simple text string match would determine that these phrases were not the same because the text strings are not identical. However, individual attribute matching may include an attribute to the phrase "Barack Obama" indicating that this phrase refers to the President of the United States of America. An attribute is also associated with the phrase "President Obama" indicating that this phrase refers to the President of the United States of America. Then individual attribute matching compares the attributes between the phrases and determines that these phrases refer to the President of the United States of America. Therefore, these phrases should be connected in some way. Additionally, in particular when entities are person names, a match on only the name is not dispositive of identity because many names are shared by different individuals. Successful resolution of a name in text from an entity record to a given authority record often depends on using information beyond the name. For successful disambiguation, a rich authority record that contains diverse, high quality information relevant to the entity is desired. For example, additional information relevant to an entity "Michael Jordan" would help to disambiguate and resolve a person entity to "Michael I. Jordan," the University of California-Berkeley professor instead of resolving it to the famous American basketball player "Michael Jordan."

Entity resolution techniques have used Wikipedia® as a resource for resolving named entities. Wikipedia® articles are often very helpful when resolving due to its semi-structured content with relevant information about named entities. However, in a situation where resolution of a large population of person names occurs, Wikipedia® is not a comprehensive source of information. Wikipedia® generally focuses on creating articles and links for movie stars, professional sports players, politicians, writers, other celebrities and the like. Therefore, at least for individual people, using this approach remains highly inadequate because the majority of people to be resolved do not have any Wikipedia® entries. Most of the time the person name to be resolved does not have an entry in Wikipedia®, making the news and public information significant sources of additional information about the person.

Numerous known approaches have addressed the problem of entity resolution or entity matching. Known approaches include 1) an approach for resolving author entities by referring to the source of entity (see W. Shen, P. DeRose, L. Vu, A. Doan, and R. Ramakrishnan, "Source-aware entity matching: A compositional approach"); 2) an approach for disambiguating named entities based on popularity and context similarity (see J. Hoffart, M. A. Yosef, I. Bordino, H. Furstenau, M. Pinkal, M. Spaniol, B. Taneva, S. Thater, and G. Weikum, "Robust disambiguation of named entities in text"); and 3) an approach for analyzing a link structure of a social network to disambiguate the mentions represented by the network nodes (see D. Balasuriya, N. Ringland. J. Nothman. T. Murphy, and J. R. Curran, "Named entity recognition in Wikipedia"). However, the first known approach does not necessarily work on generic person named entities retrieved from unstructured text, the second known approach does not actually enhance the authority record to improve the resolution accuracy, and the third known approach presumes that the entity in question belongs to a social network that may be accessed and analyzed.

One particular known approach to the problem includes the parent patent application U.S. patent application Ser. No.

12/341,913 entitled "Systems, Methods, and Software for Entity Relationship Database Resolution." Generally, entity records are resolved to a structured authority record stored in a master record database. For example, entity records are resolved using structured resolution requests that consist of the named entity string extracted from the entity record with a name entity tagger, as well as information that co-occurs with the tagged name. Co-occurring information includes such elements as words occurring in close proximity to the reference, job title information, location names, organization names, and other person names. The source information in the authority record is built, for example, from professional directory databases containing limited curriculum vitae data such as name, company affiliation, job title, and work address. Supporting information such as current work activity, current clients, current associates, and other identifying information is not initially present in the authority records. For example, consider the authority record for ex-Illinois governor "Rod Blagojevich," prosecuted in 2011 on fraud and corruption charges. An exemplary authority record for him might contain his name (Rod Blagojevich), job-title (Governor), location (Chicago, Ill.), political affiliation (Democrat) with no reference to his involvement in corruption and misconduct in office, as the original authority record is created well before the corruption story. So an entity record corresponding to the following news story has no matching evidence other than the name to match to his associated authority record: "The Rod Blagojevich who once challenged a prosecutor to face him like a man, the glad-handing politician who took to celebrity TV shows to profess his innocence, was nowhere to be found Wednesday as he was sentenced to 14 years in prison for corruption." However, if the authority record could be enhanced to include the term "corruption" based on several entity records where his name co-appeared with the term, it would be easier to resolve the entity record to the correct authority record. That being said, manually updating the authority record with timely information is a daunting and extremely resource intensive task. Therefore, a better way is needed to enhance authority records.

Accordingly, the present inventors identified a need for improving entity resolution for sparsely populated entity records and information addition within an authority record.

SUMMARY

The inventors propose an automated technique to enhance a master record database by adding additional, relevant information to existing authority records beyond typical identifying information, which, for an individual may be information such as name, address, and date of birth. For many potential matches, limited information in the authority record prevents scores from rising to high confidence levels. One advantage of the improvement is to boost the number of good, high scoring matches between entity records and a given authority record by harvesting the additional supporting facts to populate otherwise sparse supporting fields of the authority records. In particular, the improvement allows for updating information in an authority record when at least one threshold is met or exceeded. One exemplary threshold may be a count threshold of how many times the additional information is identified. For example, if the count threshold is equal to or greater than a count of three and the four new entity records that match to the organization Thomson Reuters® include a new location of Sydney, Australia, then the count threshold is exceeded. In addition, the information regarding the new location of Sydney, Australia is added to the Thomson Reuters® authority record within an organization authority file. An authority file is an aggregate of a set of authority records.

Another advantage permits more efficient resolution of sparsely populated records. Since additional information is constantly being added to each authority record within the authority file, an updated authority file becomes inherently "smarter" as the new information is being incorporated. In addition, this information may be used to improve regression models and to resolve entity records that earlier lacked enough supporting evidence to match to an authority record. For example, a sparsely populated entity record includes the text strings (e.g., phrases) "Michael Jordan" and "basketball player." If the additional information "basketball player" is added to an authority record before the exemplary sparse entity record is resolved, the sparse entity record may have a better chance at being resolved to the proper, given individual.

Additional advantages and/or features of the present invention will be set forth in part in the description. It is to be understood that both the foregoing general description and the following detailed description of the present invention are exemplary and explanatory and are intended to provide further explanation of the present invention as claimed.

DETAILED DESCRIPTION OF THE EXEMPLARY EMBODIMENT(S)

Exemplary System

Figure 1:
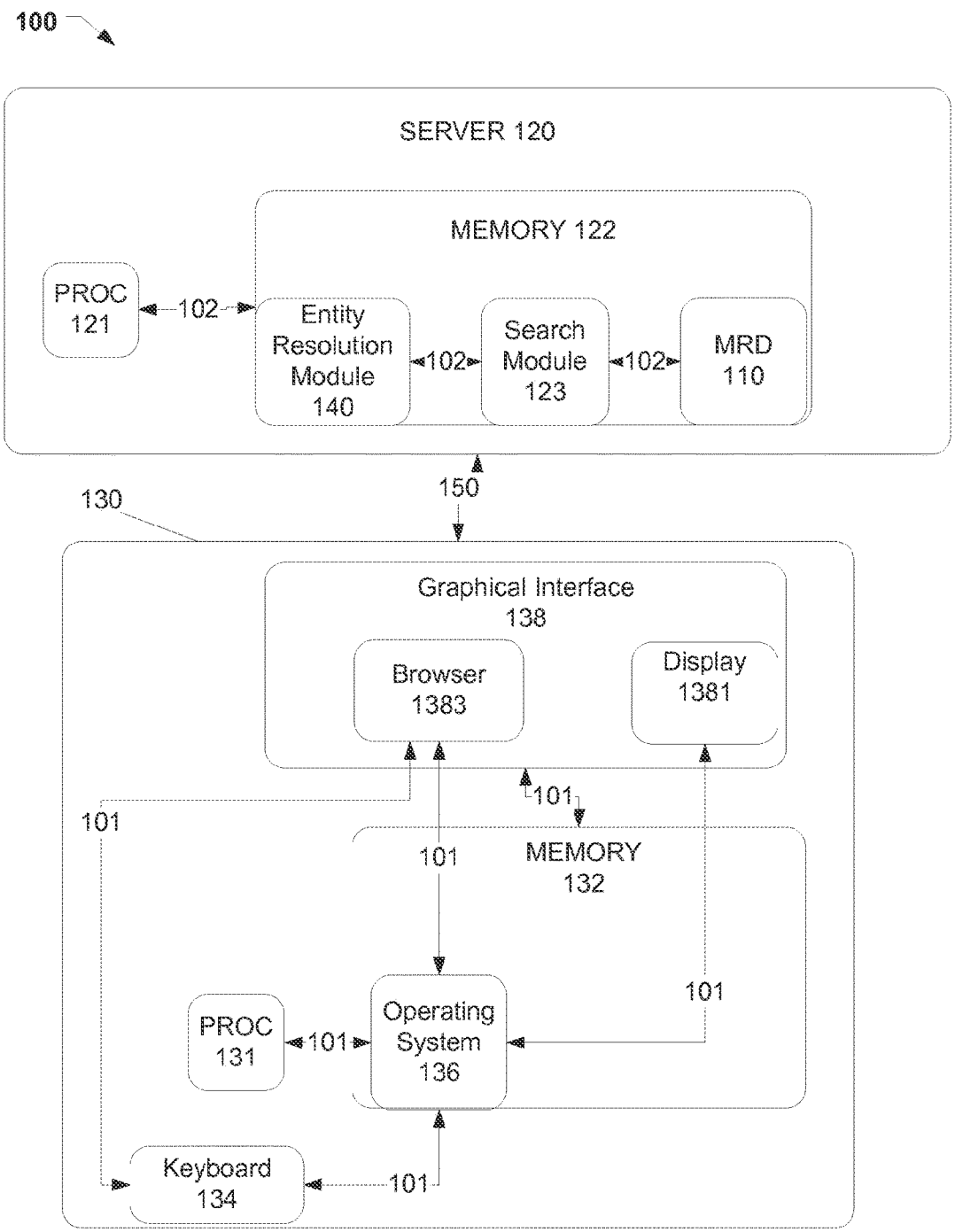
FIG. 1 is an exemplary system 100 which corresponds to one or more embodiments of the invention.
Figure 1A:
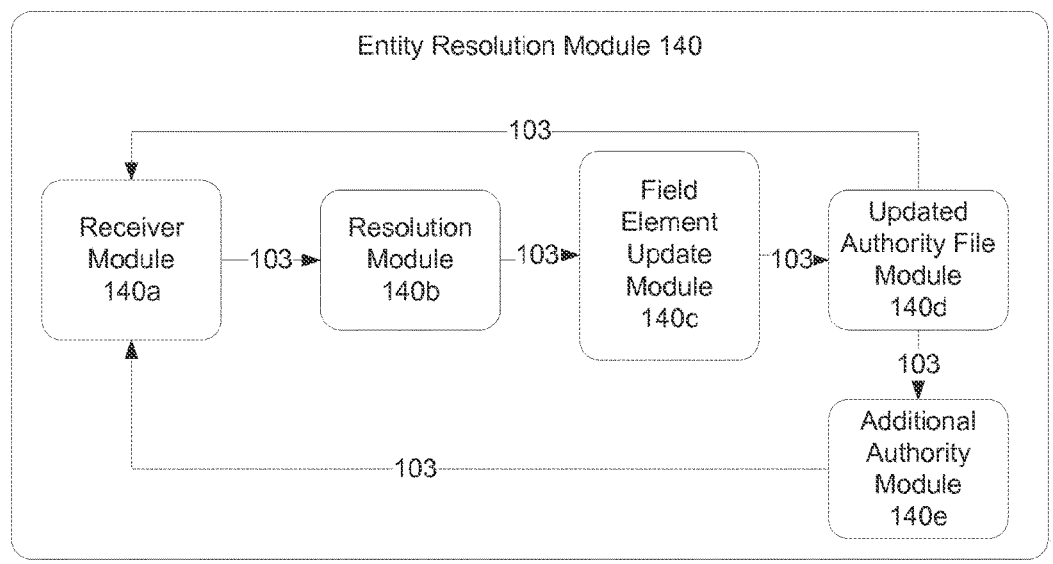
FIG. 1A is a more detailed view of the entity resolution module 140 of FIG. 1 which corresponds to one or more embodiments of the invention.

FIGS. 1 and 1A shows an exemplary system 100 and exemplary entity resolution module 140, respectively, which may be adapted to incorporate the capabilities, functions, methods, and interfaces of the present invention. System 100 includes a server 120 and an access device 130.

Server 120 is generally representative of one or more servers for serving data in the form of a webpage or other markup language with associated applets, ActiveX controls, and/or other related software and data structures. In addition, server 120 transmits a signal via a wireless or wireline transmission channel 150 to at least one access device, such as access device 130. For example, a wireless or wireline transmission channel 150 may be associated with a request to invoke a unique resource locator (URL) on access device 130. Server 120 includes a processor 121 and a memory 122, wherein the memory 122 further includes an entity resolution module 140, a search module 123 and a master record database (MRD) 110. Processor 121 and memory 122 are connected via computer bus 102, which is shown in server 120. Computer buses 101, 102 and/or 103 are buses that transmit information between the access device's components/elements and/or between multiple access devices. For example, computer bus 101 and computer bus 102 aid in transmitting information (e.g., a signal) within access device 130 and server 120, respectively. Processor 121 may use computer bus 102 to queue a request that is to be transmitted through a signal, from server 120, via a wireless or wireline transmission channel 150 and is then ultimately received by the processor module 131 through the utilization of computer bus 101. Generally, server 120 transmits the signal via a wireless or wireline transmission channel 150 to at least one access device, such as access device 130.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores an entity resolution module 140, a search module 123 and a master record database (MRD) 110.

Search module 123 includes one or more search engines and related user-interface components (not shown), for receiving and processing queries against master record database 110. Master record database 110 takes the exemplary form of one or more electronic, magnetic, and/or optical data-storage devices. Master record database 110 includes content relating to an authority file, an updated authority file (i.e., an authority file that has been updated with additional information), master records (e.g., authority records), updated authority records (i.e., authority records that have been updated with additional information), entity records and/or orphaned entity records. The content and/or a sub-set of the content within the MRD 110 may be subscriber content. Subscriber content includes content and related data for controlling, administering, and managing pay-as-you-go and/or subscription based access. For instance, a user may have to subscribe to an information retrieval service (e.g., Westlaw®). The content is stored in the master record database 110 and cannot be accessed until a set of user credentials are authenticated. For instance, user credentials may be a user name and associated password. Once the credentials are successfully authenticated on server 120, a delivery signal, associated with at least one updated authority record, is transmitted via the wireless or wireline transmission channel 150 to access device 130. For purposes described herein, successfully authenticating a set of user credentials means the user credentials were accepted by an authentication system (not shown but well known to those skilled in the art).

Access device 130 is generally representative of one or more access devices. In addition, access device 130 may be mobile or non-mobile. For example, a mobile and/or non-mobile access device may take the form of a personal computer, workstation, personal digital assistant, mobile telephone, smartphone, APPLE® iPad, and/or any other device capable of providing an effective user interface with a server and/or database. Specifically, in this exemplary embodiment, access device 130 is a mobile access device which includes a graphical interface 138, a processor module 131, a memory 132, and a keyboard 134. All of these elements are connected via computer bus 101, which is shown in various pathways throughout the access device 130.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

Memory 132 and hard drive (not shown) are examples of main memory and secondary memory, respectively. In this document, the terms "computer program medium," "computer usable medium," and "computer readable medium" may generally refer to media such as main memory, secondary memory, removable storage drive, a hard disk installed in a hard disk drive and/or other media known to those skilled in the art. The computer readable medium, for example, may include non-volatile memory, such as a floppy disk, ROM, flash memory, disk drive memory, a CD-ROM, a CD-optical drive or disc and/or other permanent storage. Additionally, a computer readable medium may include, for example, volatile storage such as RAM, buffers, cache memory, and/or network circuits. The processor module 131 reads data, instructions, messages or message packets, and other computer readable information from the computer readable medium.

In one exemplary embodiment, memory 132 stores code (machine-readable or executable instructions) for an operating system 136. Operating system 136 is coupled to a graphical interface 138 and other various components thereof, via computer bus 101. In the exemplary embodiment, operating system 136 takes the form of a version of the MICROSOFT® WINDOWS® operating system, and browser 1383 takes the form of a version of MICROSOFT® INTERNET EXPLORER®. In addition, operating system 136 interacts, via computer bus 101, with the keyboard 134 and the processor module 131. For example, the keyboard 134 sends inputs, via computer bus 101, to the operating system 136. The operating system 136 then determines the entity resolution module 140 needs to be utilized, engages the entity resolution module 140 through the signal via a wireless or wireline transmission channel 150, accepts the entity resolution module output as data and stores that data temporarily in memory 132 (e.g., RAM). Operating system 136 and browser 1383 not only receive inputs from keyboard 134, but also support rendering of graphical user interfaces within graphical interface 138.

Graphical interface 138 includes a browser 1383 and a display 1381. When the entity resolution module 140 is initiated, a display 1381 is defined in memory 132 and rendered on graphical interface 138. Upon rendering, the graphical interface 138 presents the data/results in association with the set of instructions from the entity resolution module 140 as further discussed herein.

FIG. 1A illustrates an exemplary embodiment of an entity resolution module 140. The entity resolution module 140 is configured to execute a set of modules from memory 122. The modules include a receiver module 140a, a resolution module 140b, a field element update module 140c, an updated authority file module 140d and an additional authority module 140e. Each module is described herein. The receiver module 140a is configured to receive an entity record. The entity record includes at least one entity field element. An exemplary entity record for a SEC filing containing entity field elements is illustrated below.

TABLE 1

Entity Record for Joanne Smith

| First Name | Last Name | Job Title |
|---|---|---|
| Joanne | Smith | Director of Operations |

In the exemplary entity record, there are three entity fields: 1) First Name, 2) Last Name and 3) Job Title. Each entity field may include entity field elements. For example, the entity field element for the "First Name" entity field is the text string "Joanne." In another example, the entity field element for the "Last Name" entity field is the text string "Smith." In yet another example, the entity field element for the "Job Title" entity field is the text string "Director of Operations." Exemplary entity field elements for individuals may include name, address, phone, social security number, date of birth, date of death, and gender. Exemplary entity field elements for organization may include name, known affiliates, location(s), state of incorporation, phone, employer identification number, date of incorporation, and board of director members. Some embodiments may omit one or more of these elements or include other elements. Other embodiments may link and/or establish relationships between entity field elements using techniques known to those skilled in the art. For instance, using the previous example, the entity record for Joanne Smith may include an additional entity field element entitled "Company Name" in which the text string is "Company X." In turn, the entity record for Company X may include an additional entity field element entitled "Director of Operations" in which the text string is "Joanne Smith." Links may be established to connect relationships between an organization entity record and an individual entity record. Linking may also happen between authority records, entity records, field elements, combinations and the like. Techniques for linking are known to those skilled in the art. An entity may have several names (i.e., married name, maiden name, and a.k.a. (as known as)), multiple addresses (current and previous), multiple phone numbers (work, home, and mobile) and the like. In one exemplary embodiment, at least a name and an address may be required in a person entity record. However, some embodiments may impose other information requirements, such as name, social security number or telephone. The receiver module 140a is operatively connected to a resolutions module 140b.

The resolution module 140b is configured to resolve an entity record to an authority record. Each authority record has at least one authority field element. An exemplary authority field element is a similar type of element to an exemplary entity field element. An exemplary authority record containing authority field elements is illustrated below.

TABLE 2

Authority Record for Joanne Smith

| First Name | Last Name | Job Title |
|---|---|---|
| Joanne | Smith | Director of Operations |
| | Jones | Chief Technology Officer |

In the exemplary entity record, there are three authority fields: 1) First Name, 2) Last Name and 3) Job Title. Each authority field may include authority field elements. For example, the authority field element for the "First Name" authority field is the text string "Joanne." In another example, the authority field elements for the "Last Name" authority field are the text strings "Smith" and "Jones." In yet another example, the authority field elements for the "Job Title" authority field are the text strings "Director of Operations" and "Chief Technology Officer." Generally, the authority record is populated with more field elements that an entity record because an authority record is comprehensive of all information regarding an entity. Whereas an entity record usually provides only a sub-set of information regarding a specific aspect of the entity. Returning to the current example, the authority record is for the entity "Joanne Smith," whereas the previous example shows an entity record for an SEC filing. The SEC filing entity record is a sub-set of information about the overall entity "Joanne Smith." Multiple authority records reside within an authority file which is located within MRD 110. Generally, there is only one authority record for a given entity. In addition, multiple entity records may resolve to a single authority record. For example, there is one authority record entitled "Jaclyn Strapoulous" within an individual authority file. Additionally, several entity records have the entity "Jaclyn Strapoulous" including a driver's license record, a birth certificate record and a marriage certificate record. The resolution module 140b is configured to resolve the above-mentioned entity records to the authority record "Jaclyn Strapoulous." The method for resolving entities is further described in the Exemplary Method section corresponding to FIG. 2. The resolution module 140b is operatively connected to a field element update module 140c.

The field element update module 140c is configured to calculate a field element update measurement. The field element update measurement is associated with at least one entity field element and at least one authority field element. The field element update module 140c is also configured to determine whether the field element update measurement meets or exceeds a threshold. In addition, the field element update module 140c is configured to leave, responsive to a leave unchanged determination that the field element update measurement does not meet or exceed the threshold, the authority record unchanged. The field element update module 140c being configured to leave the authority record unchanged is the same as being configured to not update the authority record. Furthermore, the field element update module 140c is configured to update, responsive to an update determination that the field element update measurement meets or exceeds the threshold, the authority record. Further explanation of calculating the field element update measurement, determining if the field element update measurement meets or exceeds a threshold and updating/not updating the authority record are described herein the Exemplary Method section corresponding to FIG. 2. The field element update module 140c is operatively connected to an updated authority file module 140d.

The updated authority file module 140d is configured to develop, responsive to an update of the authority record, an updated authority file associated with at least one updated authority record. Each updated authority record contains new, additional information regarding its corresponding entity. This new, additional information becomes beneficial during the next iteration of the resolution module 140b. Put another way, the resolution module 140b is configured to resolve an entity record to an authority record, and if the authority record includes updated information, there is a better chance of resolution due to the additional information. This is particularly helpful when an entity record is sparsely populated. The more information the updated authority record has the more likely the chances are a sparsely populated entity record may be resolved to the proper authority record. In turn, this builds a reliable and comprehensive authority file within the MRD 110. The updated authority file module 140d is operatively connected to an additional authority module 140e and the receiver module 140a.

The additional authority module 140e is configured to incorporate an additional authority record to the updated authority file. The additional authority record is associated with a set of orphan entity records wherein the set of orphan entity records relate to a similar entity. For example, the resolution module 140b is configured to not be able to resolve several entity records (i.e., orphaned entity records) to any authority record. However, the additional authority module 140e is configured to identify which orphaned entity records are associated with a similar entity. In addition, the additional authority module 140c is configured to incorporate an additional authority record if a threshold is met or exceeded. A new, additional authority record is then created within the updated authority file to incorporate the multiple entity records that were once considered a set of orphaned entity records. The additional authority module 140e is operatively connected to the receiver module 140a.

Exemplary Method as Conducted by System 100

Figure 2:
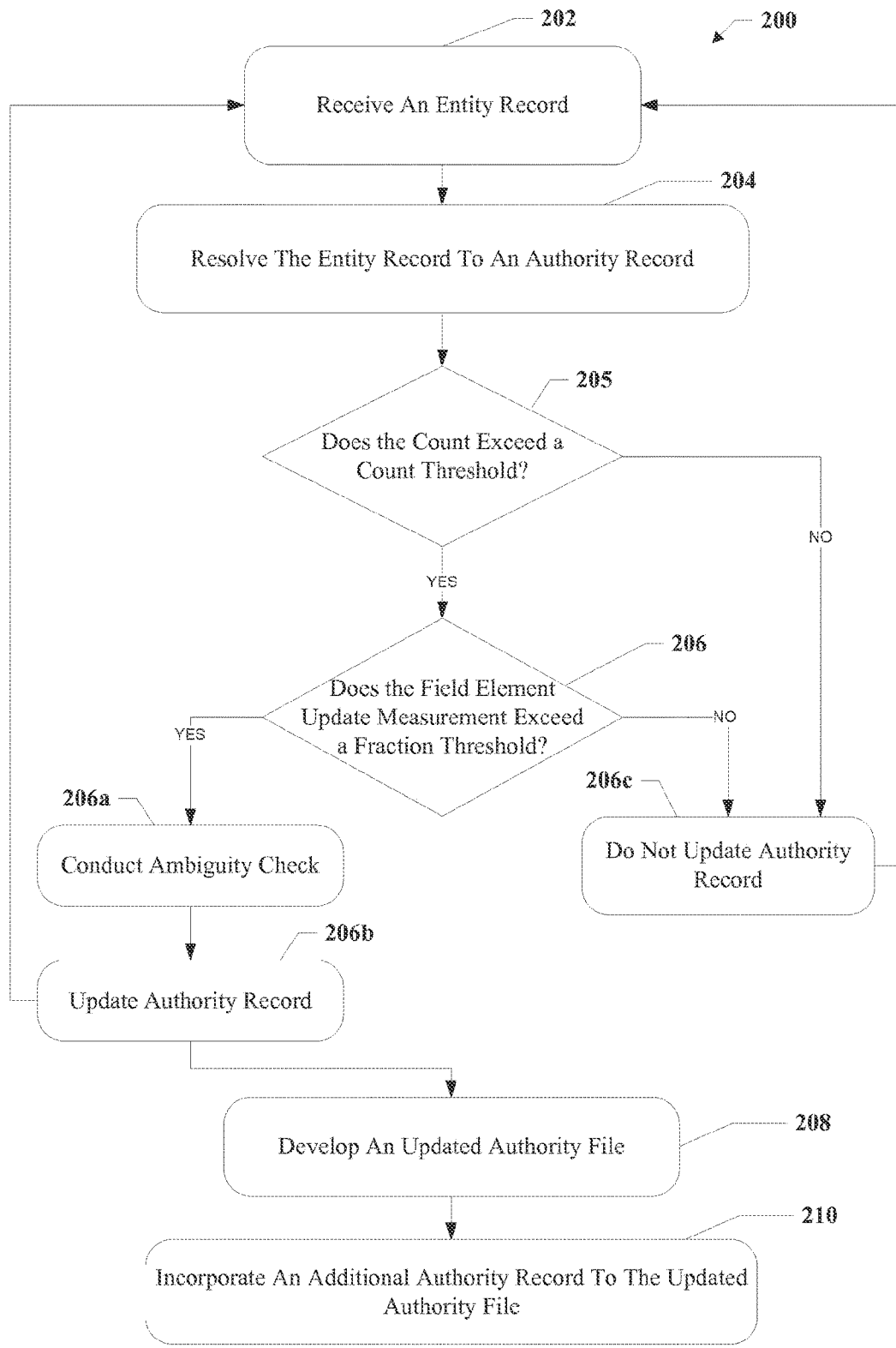
FIG. 2 is an exemplary method 200 which corresponds to one or more embodiments of the invention.

Referring now to FIG. 2, system 100 is configured to implement method 200. Method 200 includes functional blocks 202-210. These functional blocks are steps that perform actions including assignments, decisions, assessments and other like functions.

Prior to method 200 commencing, creation of a record template and a feature alignment template occurs. Each is discussed herein. A record template is essentially the format for the entity record and/or the authority record. For example, Tables 3 and 4 below show an exemplary person entity record template and an exemplary organization entity record template, respectively.

TABLE 3

Person Entity Record Template (*Mandatory Fields)

| Field Label | Data Type | Description |
| --- | --- | --- |
| Time stamp | string | Date and time |
| Name Class* | string | Class code of person to resolve. Class codes include: PU—unknown person class PC—celebrity PL—lawyer PJ—judge PP—physician PB—corporate officer or director |
| Resolution Model Class | string | U—unknown S—structured record C—Caselaw N—Newspaper T—other unstructured text |
| First Name* | string | First name of person |
| Middle Name | string | Middle name or initial of person |
| Last Name* | string | Last name of person |
| Name suffix | string | Name suffix (e.g., Jr, III) |
| Street Address | string | Street address pertaining to person |
| City | string | City of residence |
| State | string | State of residence |
| Country | string | Country of residence |
| Zip | string | Person's zipcode |
| Title | string | Person's professional title |
| Organization | string | Organization person works for |
| Co-occurring terms | List of strings | paragraphs that contain person name or co-occur with person name |
| Co-occuring people | List of strings | Names of people that person is connected to (e.g., name of boss) or that frequently co-occur with person, (e.g., Gerald Ford frequently co-occurs with name Richard Nixon). |
| Co-occurring location names | List of strings | Names of locations that person is location names strings connected to (e.g., name of residence) or that frequently co-occur with person (e.g., Barack Obama frequently co-occurs with name White House). |
| Co-occurring organization names | List of strings | Names of organizations that person is connected to (e.g., name of employer) names or that frequently co-occur with person name, (e.g., George Steinbrenner frequently co-occurs with name New York Yankees). |

TABLE 3-continued

Person Entity Record Template (*Mandatory Fields)

| Field Label | Data Type | Description |
| --- | --- | --- |
| Co-occurring other names | List of strings | Other names that person is connected to (e.g., name of event) or that names frequently co-occur with person, (e.g., Michael Johnson frequently co-occurs with name Olympics. |

TABLE 4

Organization Entity Record Template (* Mandatory Fields)

| Field Label | Data Type | Description |
| --- | --- | --- |
| Time stamp | string | Date and time |
| Organization Name* | string | Name of organization to resolve |
| Name Class | string | Class code of person to resolve. Class codes include: OU—unknown organization class OC—company OF—law firm OG—government agency OS—school |
| Resolution Model Class | string | U—unknown S—structured record C—Caselaw N—Newspaper T—other unstructured text |
| Address | String | Street address pertaining to organization |
| City | string | City of organization's headquarters |
| State | string | State of organization's headquarters |
| Country | string | Country of organizations headquarters |
| Ticker symbol | string | Ticker symbol with exchange id |
| Co-occurring terms | List of strings | Paragraphs containing or co-occurring with organization |
| Co-occurring people | List of strings | person names co-occurring with organization |
| Co-occurring location names | List of strings | List of location names co-occurring location with organization |
| Co-occurring organization names | List of strings | List of organization names co-occurring with organization |
| Co-occurring other names | List of strings | List of names (other than person, location, and company names) co-occurring with organization |

In some templates there are fields within the record that are mandatory. Those exemplary mandatory fields are shown within the above-mentioned tables. In addition, the template may also provide the data type and description of the field. For example, in Table 4, the "Address" has a data type "String" and a corresponding description states "Street address pertaining to the organization." These templates help bring consistency when receiving entity records from various sources. The various sources are discussed later within the specification. The templates may be created manually and/or automatically. Template creation techniques are known to those skilled in the art. Furthermore, these templates are then utilized to create a mapping (i.e., an alignment) between the entity fields and the authority fields. This mapping may be considered a feature alignment template. The feature alignment template may be for a person authority or an organization authority. Exemplary feature alignments are illustrated below.

TABLE 5

Feature Alignment Template with Person Authority

| Person Entity field | Aligned Person Authority field |
|---|---|
| First Name | Authority First Name |
| Last Name | Authority Last Name |
| Middle Name | Authority Middle Name |
| Title | Authority Job Title |
| Title | Authority Associated Terms |
| Organization | Authority Org Affiliation |
| Organization | Authority Associated Organization |
| Co-occurring location | Authority Associated Locations |
| Co-occurring terms | Authority Associated Terms |
| Co-occurring people | Authority Associated Person |
| Co-occurring organization names | Authority Associated Organization |

TABLE 6

Feature Alignment Template with Organization Authority

| Org Entity field | Aligned Org Authority field |
|---|---|
| Org Name | Authority Organization Name |
| Co-occurring organization | Authority Alternative Name |
| Co-occurring location | Authority City |
| Co-occurring location | Authority State |
| Co-occurring location | Authority Associated Locations |
| Co-occurring terms | Authority Associated Terms |
| Co-occurring people | Authority Associated Person |
| Co-occurring organization names | Authority Associated Organization |

For example, in Table 5, the entity field "First Name" is associated with and mapped to the authority field "Authority First Name." In other words, Table 5 provides a mapping between the first name field within an entity record and the first name field within the authority record. In some embodiments, a single field within the entity record may be associated with multiple authority fields and vice versa. For example, in Table 6, there is a "Co-occurring location" entity field within an entity record. This field may contain a city and/or state. Therefore, the information within the "Co-occurring location" entity field may be mapped to authority fields "Authority City," "Authority State" and "Authority Associated Locations." This mapping is beneficial in step 202 with resolving entity records to authority records because it identifies which fields should be analyzed during the resolution.

In step 202, an entity record is received. An entity record may originally come from various sources. For example, an entity record may originate from an external and/or internal source. An example of an external source may be a Department of Motor Vehicles (DMV) that produces an entity record regarding a vehicle registration to a given individual. An example of an internal source may be an internal publishing department that creates an attorney profile. Regardless of the source, the entity record is received by the receiver module 140a. The process then moves to step 204.

In step 204, the entity record is resolved to an authority record. The authority record is associated with an initial authority file. As stated previously, one or more authority records make up an authority file. In some embodiments, the entity record is resolved to an authority record within an authority file by using exemplary systems, methods and software described in U.S. application Ser. No. 12/341,913 filed Dec. 22, 2008 entitled "Systems, Methods, and Software for Entity Relationship Database Resolution" which is incorporated herein by reference. After the entity record is resolved to an authority record, the entity record and authority record are paired, and the pairing is stored in MRD 110. Exemplary formats of the pairing are as follows:

TABLE 7

Person Entity Record + Authority Record Pairing

| Person Entity field | Person Authority Field | Description |
|---|---|---|
| First Name | Authority First Name | First name of the person matched to the authority |
| Last Name | Authority Last Name | Last name of the person matched to the authority |
| Affiliation | Authority Affiliation | Name of the organization person affiliated with |
| Job Title | Authority Job Title | Job title of the person |
| Associated Organization | Authority Associated Organization | Organization name found in the context of the person other than his affiliation |
| Associated Location | Authority Associated Location | Locations found in the context of the person other than his address |
| Associated Person | Authority Associated Person | Other person name(s) found in the context of the person |
| Associated Terms | Authority Associated Terms | Terms found in the context of the person other than common stopwords, verbs, person name, location and organization |

TABLE 8

Organization Entity Record + Authority Record Pair

| Org Entity field | Org Authority Field | Description |
|---|---|---|
| Organization Name | Authority Org Name | First name of the organization matched to the authority |
| Organization Name | Authority Alternative Org Name | Alternative name of the organization matched to the authority |
| Associated Organization | Authority Associated Organization | Other Organization name found in the context of the Organization |

TABLE 8-continued

Organization Entity Record + Authority Record Pair

| Org Entity field | Org Authority Field | Description |
|---|---|---|
| Associated Location | Authority Associated Location | Locations found in the context of the Organization other than the address of the Organization |
| Associated Person | Authority Associated Person | Other person name(s) found in the context of the Organization |
| Associated Terms | Authority Associated Terms | Terms found in the context of the Organization other than common stopwords, verbs, person name, location and organization |

The pairing format is helpful for retrieving results from the MRD 110. For example, if a user submits a query for an authority record entitled "Jaclyn Strapoulous," system 100 is configured to implement method 200 to retrieve not only the authority record but also the corresponding entity records from the MRD 110. By saving the pairing of the entity record and the authority record, method 200 may efficiently retrieve the relationships via the pairings and ultimately provide the results to the user. Once the entity record is resolved, the process continues to step 206.

Before commencing further, a determination is made whether there is additional information in the entity records that is not already in the resolved authority record. For each aligned entity record and authority record pairing, a check is conducted to conclude if there is additional information (i.e., entity field elements) within an entity record that is not in the authority record. For example, twenty (20) entity records are resolved to the authority record "Michael Jordan." These entity records are a set of entity records that now need to be determined if additional information is not already in the given authority record. Out of the twenty (20) records, the "Location" entity field has thirteen (13) "Illinois" entity field element instances and seven (7) "California" entity field element instances. Already populated within the authority record, under the authority field "Location," is an "Illinois" authority field element. However, the additional state of California is not currently in the authority record under the authority field "Location." Therefore, a conclusion is made that the "California" entity field element is not already in the authority record. In some embodiments, a check may be needed against more than one authority field. For example, the feature alignment template may illustrate that not only does the "Location" entity field correspond to the "Location" authority field but may also correspond with an additional "Associated Location" authority field. Thus, a check may need to be conducted to each entity field to authority field mapping according to the feature alignment template. Referring back to information not already in an authority record, additional information must be considered reliable before being added to the authority record. The reliability of the additional information is measured in terms of support. The support for incorporating the additional piece of information is derived from: 1) a count threshold and 2) a fraction threshold. Each is discussed herein.

In step 205, a decision needs to be made as to whether the count of additional information instances meets or exceeds a threshold. An exemplary threshold may be a count threshold which is a pre-determined count of how many entity records should contain the new text string. Referring to the previous example, there are seven (7) instances of the new text string "California. If an exemplary count threshold is five (5), the seven (7) instances of the text string "California" have exceeded the count threshold. Therefore, support moves on to step 206.

In step 206, a decision needs to be made as to whether the field element update measurement meets or exceeds a threshold. An exemplary threshold may be a fraction threshold which is a pre-determined fraction of how many entity records, out of the total number of entity records, should contain the new text string. The exemplary field element update measurement is a fraction: (count of new text strings within a set of entity records)/(total number of entity records within a set of entity records). An exemplary fraction threshold may be a fraction of one third ($\frac{1}{3}$) or greater. Applied to the previous example, the field element update measurement is: (count of the new text string "California")/(total number of entity records within the set of entity records)=seven twentieths ($\frac{7}{20}$). The field element update measurement, seven twentieths ($\frac{7}{20}$), is compared to the fraction threshold, one third ($\frac{1}{3}$), and the field element update measurement exceeds the fraction threshold. In some embodiments, only one threshold is needed for support. Either the count threshold or the fraction threshold may be reasonable for providing support for incorporating additional information. Preferably two thresholds are used because, for instance, if only a count threshold is used for support, the total number of entity records within the set of entity records is not taken into account. For example, if there were a thousand (1,000) entity records, twenty (20) of them had a new text string, and the count threshold is fifteen (15). In this instance, the count threshold is exceeded. Yet, only twenty (20) instances of the new text string occurred out of a thousand (1,000) records. This metric may not provide enough support for incorporating additional information. Additionally, if only a fraction threshold is used for support, the fraction may be misleading when the set of entity records is small. For example, if there are ten (10) entity records and four (4) of them have a new text string, then the fraction is four tenths ($\frac{4}{10}$) or two fifths ( ). With the fraction threshold being one third ($\frac{1}{3}$), two fifths ( ) is greater than one third ($\frac{1}{3}$). Therefore, the fraction threshold is exceeded. Yet, four (4) instances of the new text string may not be enough support for incorporating additional information. Due to these disadvantages, a preferred embodiment would use at least two thresholds. Additional types of thresholds are known to those skilled in the art. Once each threshold has been met and/or exceeded, the process continues to step 206*a*.

In some embodiments, if the field element update measurement meets or exceeds a threshold, another check is performed to measure the confidence of the resolution of the entity record to the given authority record. This additional check is done to prevent insertion of irrelevant information into the authority record. For instance, an ambiguity check might be performed to ensure an accurate resolution between a set of entity records and the given authority record. Mistakes in early resolutions may greatly affect the addition of information, and down the line, future resolutions. An ambiguity check helps lower the inaccuracies of mistaken resolutions. In step 206*a*, an ambiguity check is conducted on a set of entity records for a given authority record. For example, twenty (20) records are resolved to the authority record "Michael Jordan." The ambiguity check makes sure that the twenty (20) records truly are the given Michael Jordan. For example, during the initial resolution, the match may have been made by only a first name, last name and city. The ambiguity check takes additional information from the entity records and attempts to resolve them against the authority record to verify the given entity. For example, the entity records may have a social security number and/or a phone number within each of the twenty (20) records. The social security number and phone number are checked against the authority record to determine if there is enough confidence that the entity records are a match to the identified authority record. If there is not enough confidence, that particular entity record is dropped from the set of entity records. Once the ambiguity check is complete for the set of entity records, the remaining entity records are resolved to the given authority record. The process then continues to step 206*b*.

In step 206*b*, the additional information (e.g. text strings) is added to the authority record within the proper authority field according to the mapping. For example, once all thresholds have been met or exceeded, an entity field element of "California" may now be added to the authority record within the proper authority field of "Location." Incorporating the additional information creates an updated authority record that now has more information, which in turn may provide for better resolution in the future. Put another way, the comprehensiveness and completeness of the authority records in the authority file play crucial roles in correct disambiguation and resolution of entity record to the given authority record. After the authority record is updated, the method moves to step 208.

In step 208, an updated authority file is developed by continually updating the authority records that reside within the authority file. Since the updated authority file is dynamic in the sense it is always expanding, it provides more efficient resolution on upcoming and/or previously orphaned entity records. For example, assume an entity record is considered an orphan if no resolution can made. However, if after the authority file has been updated several times, an updated authority file now has additional information on a given authority record. Thus, if an orphaned entity record is received again, the orphaned entity record may now be resolved to the given entity because of the additional information in the updated authority file. Put another way, steps 202-210 are an iterative update process with each iteration generating an updated authority file. Method 200 continues until the termination criterion is met. The termination criterion is a simple check to see whether additional information found from the last resolved entity records meets or exceeds a minimum update threshold. If there is enough additional information found, the method moves on to re-training with the next iteration. Otherwise, the method is terminated and the last updated authority file is considered the final updated authority file along with a details log record of what additional information went into the updated authority file. This details log record is stored within the MRD 110. The addition of information, along with an ever expanding authority file, allows for a better resolution of entities which in turn provides a user with better results.

On the other hand, if a threshold has not been met or exceeded, then the authority file does not get updated. In step 206*c*, the additional information that is identified in the field element update measurement is not added to the authority record. Consequently, these entity records may still be resolved to the authority record. However, the additional information remains within the entity record and is not added to the authority record. For example, a DMV record that is resolved to "Michael Jordan" may stay resolved but the new information regarding an additional location may not have exceeded the fraction threshold. Therefore the additional location information is not added to any authority field. Instead, a user would have to open the DMV record to see the additional location of California.

In step 210, some embodiments incorporate an additional authority record into the updated authority file. The additional authority record is associated with a set of orphaned entity records wherein the orphaned entity records relate to a given entity. Various techniques known to those skilled in the art may be used to determine whether an additional authority record should be added to an updated authority file. As can be appreciated, adding an authority record that corresponds with a rare entity name may be considered differently than adding an authority record that corresponds with a common entity name when determining whether an additional authority record should be added to an updated authority file. For instance, if an entity name is rare, such as Xerox, Inc., and there are only two entity records related to that entity, then more than likely the Xerox, Inc. entity is added to the authority file because the rarity of the name does not require several entity records before adding an authority record to the authority file. In another instance, if an entity name is common, such as John Smith, there may need to be several entity records with independent sources before determining that an additional John Smith should be added to the authority file. For example, three (3) independent new sources state that a John Smith with a rare heart defect is born on Jan. 1, 2012. Given that three independent sources reported the same event regarding a John Smith born on Jan. 1, 2012, this may be enough to decide that an additional John Smith authority record should be added to the authority file. In another example, ten (10) entity records related to a given entity of "Jaclyn Strapoulous" are considered orphaned entity records because the given entity "Jaclyn Strapoulous" is not an authority record. However, since there are now ten (10) entity records that have the same given entity, a determination is made that the given entity "Jaclyn Strapoulous" should now be incorporated as an additional authority record entitled "Jaclyn Strapoulous." An exemplary determination method may be meeting or exceeding an addition threshold. For example, if ten or more orphaned entity records are related and grouped together than the additional authority record gets incorporated into the updated authority file. As stated previously, incorporating additional authority records expands the authority file to provide a comprehensive listing of entities.

Working Example

Once the updated authority file located within the MRD 110 has at least one updated authority record, a user may then search the MRD 110 to ultimately receive a listing of authority records and their corresponding entity records. In some embodiments, a user submits a query by interfacing with a graphical interface 138, in particular browser 1383. The user query is transmitted via a transmission channel 150 to entity resolution module 140 wherein it is received by the receiver module 140*a*. The user query is associated with a set of information regarding an entity. In response to receiving the query, at least one updated authority record is retrieved from MRD 110. Next, a delivery signal is being transmitted wherein the delivery signal is associated with the at least one updated authority record. The updated authority record is formed by resolving an entity record to an authority record wherein the authority record includes at least one authority field element and the entity record includes at least one entity field element. The updated authority record is further formed by updating the authority record to an updated authority record when a field element update measurement meets or exceeds a threshold. The formation of the updated authority record may occur prior to receiving the user query or in response to receiving the user query. The field element update measurement is associated with the at least one entity field element and the at least one authority field element. For example, after one or more updated authority records are stored within the MRD 110, a user has the capability via a user query to search the MRD 110 and ultimately retrieve one or more updated authority records based on the user query. That being said, if a user does a search on a Monday for a given individual, by Friday the updated authority file may include additional information about the entity because the resolution and addition of information may provide the user with a more inclusive authority record. For instance, on a Monday, a user searches for "Jaclyn Strapoulous" and receives information regarding her marriage certificate, a motor vehicle registration and a birth certificate. Between Monday and Friday, method 200, as conducted by system 100, has now updated the authority file with additional information regarding Jaclyn's boat registration. Therefore, on the following Friday when the user searches for "Jaclyn Strapoulous," the information now includes the boat registration in addition to the pre-existing information from the previous search.

The embodiments described above and in the claims are intended only to illustrate and teach one or more ways of practicing or implementing the present invention, not to restrict its breadth or scope. For example, the entity resolution module 140 may be executed prior to a user initiation (i.e., pre-processing) or the entity resolution module 140 may be consistently executed automatically in the background. In another example, FIG. 1 shows browser 1383 and display 1381 as having the ability to display simultaneously; however, in operation, some embodiments may present them at separate times. The actual scope of the invention, which embraces all ways of practicing or implementing the teachings of the invention, is defined by the claims and their equivalents.

FIGS. 1 through 2 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not as limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method comprising:
  receiving an entity record document, the entity record document comprising at least one entity field element;
  resolving the entity record document to an authority record being associated with an initial authority file, the authority record comprising at least one authority field element; and
  calculating a field element update measurement, the field element update measurement being associated with the at least one entity field element and the at least one authority field element and:
    if the field element update measurement does not meet or exceed a threshold, leaving the authority record unchanged; or
    if the field element update measurement meets or exceeds a threshold:
      computing a confidence measurement, the confidence measurement being associated with at least one different entity field element resolved to the authority record; and;

if the confidence measurement exceeds a predetermined confidence measurement;
updating the authority record; and
developing, in response to updating the authority record, an updated authority file associated with at least one updated authority record.

2. The computer-implemented method of claim 1 wherein the entity record document and the authority record are each associated with an individual.

3. The computer-implemented method of claim 1 wherein the entity record document and the authority record are each associated with an organization.

4. The computer-implemented method of claim 1 wherein the initial authority file comprises one or more of an individual authority record and an organization authority record.

5. The computer-implemented method of claim 1 wherein the threshold is a fraction threshold.

6. The computer-implemented method of claim 5 further comprising determining, in response to the step of resolving, whether a count meets or exceeds a count threshold and;
if the count does not meet or exceed the count threshold, leaving the authority record unchanged; or
if the count meets or exceeds the count threshold, proceeding to calculating step.

7. The computer-implemented method of claim 1 further comprising incorporating an additional authority record to the updated authority file, the additional authority record being associated with a set of orphan entity record documents, the set of orphan entity record documents relating to a given entity.

8. A computer-implemented method comprising:
receiving a user query, the user query associated with a set of information regarding an entity;
retrieving, in response to receiving the user query, at least one updated authority record, the at least one updated authority record having been formed by:
resolving an entity record document to an authority record, the authority record comprising at least one authority field element and the entity record document comprising at least one entity field element; and
updating the authority record to an updated authority record when a confidence measurement exceeds a predetermined confidence measurement, the confidence measurement being associated with at least one different entity field element resolved to the authority record; the confidence measurement computed when a field element update measurement meets or exceeds a threshold, the field element update measurement being associated with the at least one entity field element and the at least one authority field element; and
transmitting a delivery signal, the delivery signal being associated with the at least one updated authority record.

9. The computer-implemented method of claim 8 wherein the at least one updated authority record having been formed prior to receiving the user query.

10. The computer-implemented method of claim 8 wherein the at least one updated authority record having been formed in response to receiving the user query.

11. A system comprising:
a processor;
a memory coupled to the processor;
an entity resolution module stored in the memory for execution by the processor, the entity resolution module comprising:
a receiver module, the receiver module configured to receive an entity record document, the entity record document comprising at least one entity field element;
a resolution module, the resolution module configured to resolve the entity record document to an authority record being associated with an initial authority file, the authority record comprising at least one authority field element;
a field element update module, the field element update module configured to:
calculate a field element update measurement, the field element update measurement being associated with the at least one entity field element and the at least one authority field element;
determine whether the field element update measurement meets or exceeds a threshold;
leave, responsive to a leave unchanged determination that the field element update measurement does not meet or exceed the threshold, the authority record unchanged; and
compute, responsive to an update determination that the field element update measurement meets or exceeds the threshold, a confidence measurement, the confidence measurement being associated with at least one different entity field element resolved to the authority record;
update, responsive to a determination that the confidence measurement exceeds a predetermined confidence measurement, the authority record; and
an updated authority file module, the updated authority file module configured to develop, responsive to an update of the authority record, an updated authority file associated with at least one updated authority record.

12. The system of claim 11 wherein the entity record document and the authority record are each associated with an individual.

13. The system of claim 11 wherein the entity record and the authority record are each associated with an organization.

14. The system of claim 11 wherein the initial authority file comprises one or more of an individual authority record and an organization authority record.

15. The system of claim 11 further comprising an additional module, the additional module configured to incorporate an additional authority record to the updated authority file, the additional authority record being associated with a set of orphan entity record documents, the set of orphan entity record documents relating to a given entity.

* * * * *